US009632587B2

(12) United States Patent
Duan

(10) Patent No.: US 9,632,587 B2
(45) Date of Patent: Apr. 25, 2017

(54) INTERACTIVE RECOGNITION SYSTEM AND DISPLAY DEVICE

(71) Applicants: BOE TECHNOLOGY GROUP CO., LTD., Beijing (CN); BEIJING BOE MULTIMEDIA TECHNOLOGY CO., LTD., Beijing (CN)

(72) Inventor: Xin Duan, Beijing (CN)

(73) Assignees: BOE TECHNOLOGY GROUP CO., LTD., Beijing (CN); BEIJING BOE MULTIMEDIA TECHNOLOGY CO., LTD., Beijing (CN)

( * ) Notice: Subject to any disclaimer, the term of this patent is extended or adjusted under 35 U.S.C. 154(b) by 5 days.

(21) Appl. No.: 14/421,928

(22) PCT Filed: Apr. 28, 2014

(86) PCT No.: PCT/CN2014/076398
§ 371 (c)(1),
(2) Date: Feb. 16, 2015

(87) PCT Pub. No.: WO2015/096335
PCT Pub. Date: Jul. 2, 2015

(65) Prior Publication Data
US 2016/0034038 A1   Feb. 4, 2016

(30) Foreign Application Priority Data
Dec. 25, 2013  (CN) .......................... 2013 1 0727078

(51) Int. Cl.
*G09G 5/00* (2006.01)
*G06F 3/01* (2006.01)
(Continued)

(52) U.S. Cl.
CPC ............ *G06F 3/017* (2013.01); *G06F 3/0304* (2013.01); *G06F 3/038* (2013.01); *G06F 3/0386* (2013.01);
(Continued)

(58) Field of Classification Search
CPC .......... G06F 3/017; G06F 3/038; G06F 3/042; G06F 3/0304; G06F 3/0416; G06F 3/03547
(Continued)

(56) References Cited

U.S. PATENT DOCUMENTS 4,521,772 A * 6/1985 Lyon ..................... G06F 3/0317
                                                       235/472.01
4,565,999 A * 1/1986 King ....................... G06F 3/012
                                                       340/4.11
(Continued)

FOREIGN PATENT DOCUMENTS

CN      101253464 A    8/2008
CN      101907959 A    12/2010
(Continued)

OTHER PUBLICATIONS

Second Chinese Office Action Appln. No. 201310727078.9; Dated Jan. 20, 2016.
(Continued)

*Primary Examiner* — Prabodh M Dharia
(74) *Attorney, Agent, or Firm* — Ladas & Parry LLP

(57) ABSTRACT

The disclosure describes an interactive recognizing system and a display device provided with the interactive recognizing system, which belongs to a technical field of interactive control. The interactive recognizing system includes: a sensing unit constituted of several sensing devices and configured to receive light signal; a coordinate recognizing unit configured to recognize a coordinate of the light signal
(Continued)

received by the sensing unit on the sensing unit and recognize a motion track of the light signal on the sensing unit; a determining unit configured to determine a control instruction represented by the motion track; and an executing unit configured to execute the control instruction.

17 Claims, 4 Drawing Sheets

(51) Int. Cl.
*G06F 3/042* (2006.01)
*G06F 3/038* (2013.01)
*G06F 3/041* (2006.01)
*G06F 3/0354* (2013.01)
*G06F 3/03* (2006.01)

(52) U.S. Cl.
CPC .......... *G06F 3/03547* (2013.01); *G06F 3/042* (2013.01); *G06F 3/0416* (2013.01)

(58) Field of Classification Search
USPC ............ 345/156–184; 398/128; 349/16, 106; 353/57, 86
See application file for complete search history.

(56) References Cited

U.S. PATENT DOCUMENTS

| | | | | |
|---|---|---|---|---|
| 4,567,480 A * | 1/1986 | Blanchard | ............ | G06F 3/0421 178/18.09 |
| 5,926,168 A * | 7/1999 | Fan | ....................... | G06F 3/0325 345/158 |
| 5,960,106 A * | 9/1999 | Tsuchiya | ............... | G06T 7/0006 382/144 |
| 6,548,967 B1 * | 4/2003 | Dowling | ............ | G06Q 30/0201 315/307 |
| 7,612,923 B2 * | 11/2009 | Rusman | .................. | G06F 3/014 235/462.01 |
| 2004/0161246 A1 * | 8/2004 | Matsushita | ............. | G06F 3/002 398/187 |
| 2007/0046625 A1 | 3/2007 | Yee | | |
| 2007/0288194 A1 * | 12/2007 | Boillot | .................. | G06F 3/0304 702/150 |
| 2008/0252737 A1 * | 10/2008 | Morehouse | ........... | G06F 3/0304 348/222.1 |
| 2010/0092065 A1 * | 4/2010 | Jones | ..................... | G06Q 20/18 382/135 |
| 2010/0225615 A1 * | 9/2010 | Kurokawa | .............. | G06F 3/042 345/175 |
| 2011/0043486 A1 * | 2/2011 | Hagiwara | ......... | G02F 1/133514 345/175 |
| 2011/0090176 A1 * | 4/2011 | Christiansson | ....... | G06F 3/0421 345/175 |
| 2011/0109554 A1 * | 5/2011 | Boissier | .............. | G06F 3/03545 345/166 |
| 2011/0163996 A1 * | 7/2011 | Wassvik | ................ | G06F 3/0421 345/175 |
| 2011/0241986 A1 * | 10/2011 | Feng | ...................... | G03B 21/14 345/158 |
| 2012/0013529 A1 * | 1/2012 | McGibney | ........... | G06F 3/0425 345/156 |
| 2012/0044210 A1 | 2/2012 | Chen et al. | | |
| 2012/0093688 A1 * | 4/2012 | Harmon | .................... | A61L 2/10 422/24 |
| 2012/0162061 A1 * | 6/2012 | Hildebrandt | ......... | G06F 3/0321 345/156 |
| 2013/0135189 A1 * | 5/2013 | Yin | ...................... | G06F 3/0421 345/156 |
| 2013/0135260 A1 * | 5/2013 | Damhaug | ............. | G06F 3/0425 345/175 |
| 2013/0314312 A1 * | 11/2013 | Gruhlke | ................ | G06F 3/0421 345/156 |
| 2014/0118270 A1 * | 5/2014 | Moses | ..................... | G06F 3/041 345/173 |
| 2014/0158861 A1 | 6/2014 | Xu et al. | | |
| 2014/0313165 A1 * | 10/2014 | Lam | ..................... | H04N 9/3179 345/175 |
| 2015/0084994 A1 * | 3/2015 | Wyrwas | ................... | G09G 3/02 345/690 |
| 2015/0097768 A1 * | 4/2015 | Holz | ....................... | G06F 3/017 345/156 |
| 2015/0103004 A1 * | 4/2015 | Cohen | .................. | G06F 3/0483 345/158 |
| 2015/0277583 A1 * | 10/2015 | Kasahara | ............. | G06F 3/0488 345/179 |
| 2015/0309663 A1 * | 10/2015 | Seo | ........................ | G06F 3/0421 345/175 |
| 2016/0337827 A1 * | 11/2016 | Bjontegard | ....... | H04L 29/06034 |

FOREIGN PATENT DOCUMENTS

| | | |
|---|---|---|
| CN | 102023732 A | 4/2011 |
| CN | 102801409 A | 11/2012 |
| CN | 103049139 A | 4/2013 |
| CN | 103729096 A | 4/2014 |

OTHER PUBLICATIONS

First Chinese Office Action Appln. No. 201310727078.9; Dated Jul. 13, 2015.
International Search Report Appln. No. PCT/CN2014/076398; Dated Aug. 27, 2014.
Written Opinion of the International Searching Authority Appln. No. PCT/CN2014/076398.

* cited by examiner

INTERACTIVE RECOGNITION SYSTEM AND DISPLAY DEVICE

TECHNICAL FIELD

The present disclosure relates to an interactive recognition system and a display device provided with the interactive recognition system.

BACKGROUND

With a progressive development of display control technology, an increasing number of display devices, in particular display devices with a large-size screen, already have a function of human-computer interaction. At present, quite common human-computer manners comprise implementations of gesture recognition control, voice recognition control and somatosensory recognition control and the like. For example, the gesture recognition control interaction takes photos of actions of a user's hands by using a camera, recognizes the actions of the user's hands, and analyzes a corresponding control instruction, so as to realize a control of the display device. For another example, the voice recognition control interaction collects voices of a user by using a voice collecting means such as a microphone and the like, performs voice recognition, and recognizes a corresponding voice control instruction, so as to realize the control of the display device.

In the process of implementing the present disclosure, the inventor finds that the prior art has at least following problems: all of the existing human-computer interaction manners, such as gesture recognition control, voice recognition control and somatosensory recognition control, require to connect an external device such as a camera and a microphone and the like to the display device, thus resulting in that cost of the device used to perform human-computer interaction is relatively high.

SUMMARY

In embodiments of the present disclosure, there are provided an interactive recognition system and a display device provided with the interactive recognition system, which solves the technical problem that cost of the existing device used to perform human-computer interaction is relatively high.

According to an embodiment of the present disclosure, there is provided an interactive recognition system, comprising: a sensing unit configured to receive a light signal; a coordinate recognizing unit configured to recognize a coordinate of the light signal received by the sensing unit on the sensing unit and recognize a motion track of the light signal on the sensing unit; a determining unit configured to determine a control instruction represented by the motion track; and an executing unit configured to execute the control instruction.

In an example, the sensing unit is a sensing matrix formed by an arrangement of several sensing devices.

In an example, the sensing device is a photosensitive diode.

Further, according to the embodiment of the present disclosure, the coordinate recognizing unit comprises a horizontal ordinate recognizing subunit and a vertical ordinate recognizing subunit configured to recognize a horizontal ordinate and a vertical ordinate of the light signal received by the sensing unit on the sensing unit, respectively.

Further, according to the embodiment of the present disclosure, the determining unit comprises a threshold determining subunit in which a time threshold that the light signal lasts is stored.

Further, according to the embodiment of the present disclosure, the determining unit comprises a storing subunit in which a correspondence relationship between the motion track and the control instruction is stored.

Further, according to the embodiment of the present disclosure, the interactive recognizing system further comprises a feedback unit configured to prompt the control instruction determined by the determining unit.

In an example, the feedback unit comprises at least one of an indicator, a screen and a loudspeaker.

According to an embodiment of the present disclosure, there is further provided a display device comprising a display module and the interactive recognizing system described above.

In an example, a sensing unit of the interactive recognizing system is arranged on the display module.

Compared with the prior art, the above technical solutions provided in the present disclosure have the following advantages: by using the sensing devices to form the sensing unit so as to receive the light signal, the user can utilize a handheld light emitting device to transmit a light signal to the sensing unit and move the light emitting device, so that an irradiation point of the light signal transmitted by the handheld light emitting device on the sensing unit has certain motion track; the coordinate recognizing unit can recognize the irradiation point of the light signal on the sensing unit and its motion track, then the determining unit determines the control instruction represented by the motion track, and finally the executing unit executes the control instruction. Therefore, the interactive recognizing system provided in the present disclosure is not required to be provided with an external device with a high cost, because using an ordinary light emitting device, for example a laser pointer and the like, is capable of implementing operation of human-computer interaction, so as to reduce the cost on the apparatus used to perform human-computer interaction. In addition, when using the display device provided in the present disclosure, the user can directly utilize a point light source such as the laser pointer and the like to send the control instruction to the sensing unit while viewing an image displayed by the display device, so as to facilitate implementation of human-computer interaction.

BRIEF DESCRIPTION OF THE DRAWINGS

In order to more clearly describe technical solutions in embodiments of the present disclosure, accompanying drawings needed to be used in description of the embodiments will be briefly introduced below.

DETAILED DESCRIPTION

Technical solutions in embodiments of the present disclosure will be clearly and completely described by combining with the accompanying drawings in the embodiments of the present disclosure.

Figure 1:
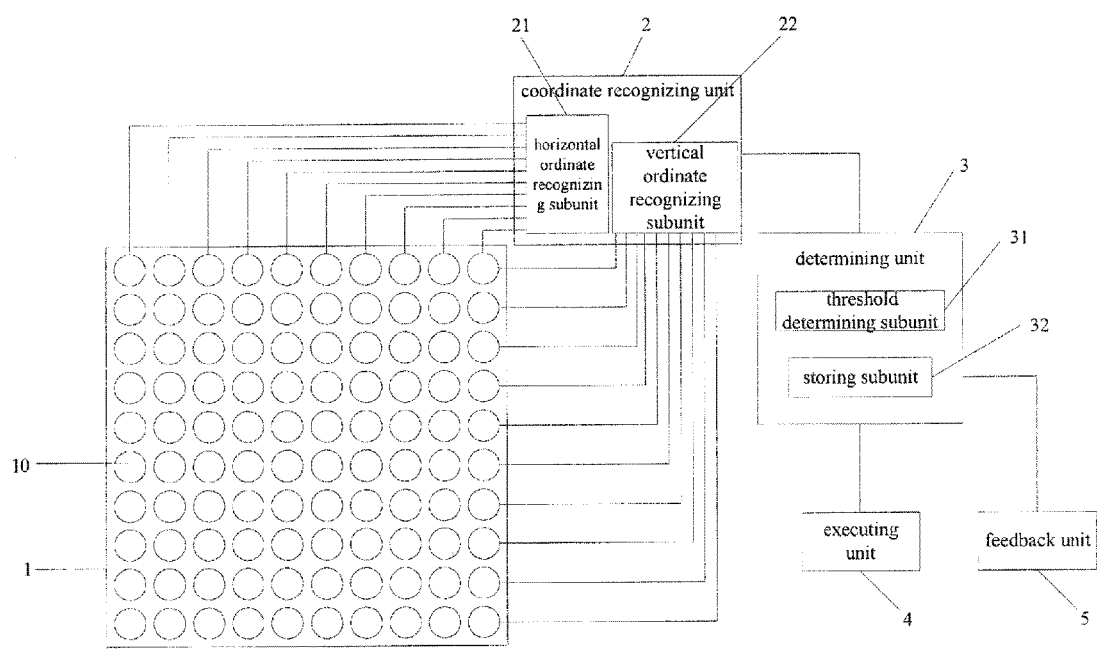
FIG. 1 is a schematic diagram of an interactive recognizing system provided in an embodiment of the present disclosure.

As shown in FIG. 1, an interactive recognizing system provided in an embodiment of the present disclosure comprises: a sensing unit 1, a coordinate recognizing unit 2, a determining unit 3 and an executing unit 4.

The sensing unit 1 is configured to receive a light signal. Optionally, the sensing unit 1 is a sensing matrix formed by an arrangement of several sensing devices. In the embodiment, the sensing device is described by taking a photosensitive diode as an example. The photosensitive diode is actually a photosensitive resistor which is very sensitive to change of light and changes a light signal into an electrical signal. Since the sensing matrix is constituted of a plurality of photosensitive diodes, it can sense a location of the light signal on the sensing matrix, and thus can advantageously recognize the motion track of the light signal.

The coordinate recognizing unit 2 is configured to recognize a coordinate of the light signal received by the sensing unit 1 on the sensing unit 1 and a motion track of the light signal on the sensing unit 1. As a preferred embodiment, the coordinate recognizing unit 2 in particular comprises a horizontal ordinate recognizing subunit 21 and a vertical ordinate recognizing unit 22 which are configured to recognize a horizontal ordinate and a vertical ordinate of the light signal received by the sensing unit 1 on the sensing unit 1, respectively.

The determining unit 3 is configured to determine a control instruction represented by the motion track.

The executing unit 4 is configured to execute the control instruction.

Further, the interactive recognizing system provided in the embodiment of the present disclosure further comprises a feedback unit 5 configured to prompt the control instruction determined by the determining unit 3. There may be a variety of specific implementations for the feedback unit 5. The first specific implementation may be for example an implementation of adopting an indicator, wherein a green light represents a valid control instruction, and a red light represents an invalid control instruction; the second specific implementation may be for example an implementation of adopting a small-size screen, i.e., arranging a small-size screen to display the control instruction determined by the determining unit 3, if the control instruction is a valid control instruction, it can be displayed on the small-size screen; and if the control instruction is an invalid control instruction, a text or pattern of "invalid" can be displayed on the small-size screen; the third specific implementation may be for example an implementation of adopting a voice feedback, for example, being played by a loudspeaker, if the control instruction determined by the determining unit 3 is a valid control instruction, a voice of the control instruction can be played by the loudspeaker; and if the control instruction is an invalid control instruction, a voice of "invalid" can be played by the loudspeaker. Due to the arrangement of the feedback unit, the user can clearly know whether or not his/her operation is valid or not.

Since the sensing unit 1 in the embodiment of the present disclosure is constituted of photosensitive diodes 10, the user can perform an interaction operation on the interactive recognizing system by using an ordinary point light source such as a laser pointer, without needing to be additionally provided with an external device. The cost of the laser pointer has been currently very low. In addition, laser has good parallelization, which is advantageous for accurate transmission of the light signal.

Figure 2:
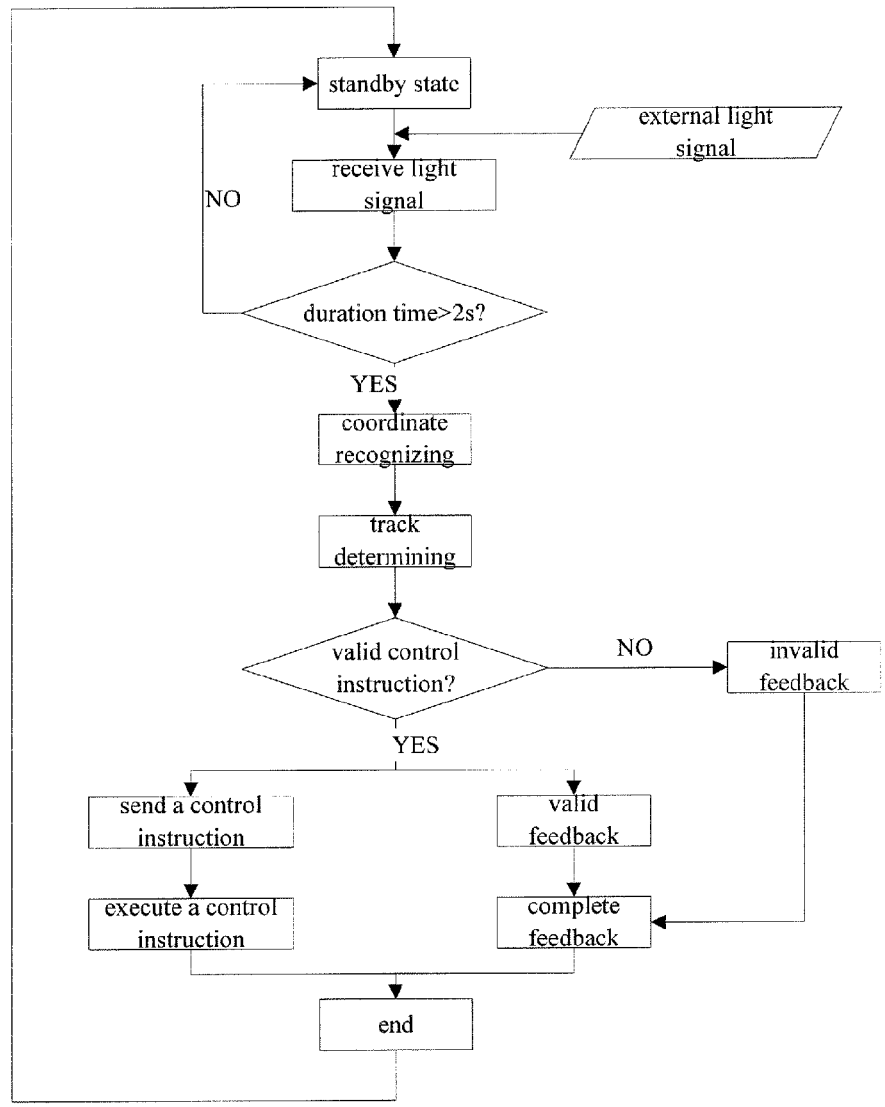
FIG. 2 is a flowchart of operation of an interactive recognizing system provided in an embodiment of the present disclosure.

An operation flow of the interactive recognizing system is shown in FIG. 2.

The interactive recognizing system is in a standby state in the beginning. When the user irradiates the sensing unit 1 by using the laser pointer, the sensing unit 1 can receive the light signal, and the coordinate of the light signal on the sensing unit 1 is recognized by a mutual cooperation of the horizontal ordinate recognizing subunit 21 and the vertical ordinate recognizing subunit 22 in the coordinate recognizing unit 2.

Sometimes the user's irradiation on the sensing unit 1 by using the laser pointer is not to send the control instruction, for example, when playing PowerPoint, the user utilizes the laser pointer to irradiate key contents on the image. Such operation of the user generally has a relatively short irradiation time. Therefore, in order to avoid a false operation caused by such operation and reduce invalid workload of the interactive recognizing system, the coordinate recognizing unit 2 firstly detects a duration time of the light signal. Preferably, a threshold determining subunit 31 can be arranged in the determining unit 3. By setting and storing a time threshold in the threshold determining subunit 31, it is initially determined that the detected light signal is a valid signal when the duration time of the detected light signal exceeds the time threshold, and the time threshold can be generally set to be fall into a range of 1 s to 5 s. For example, the time threshold is set to be 2 s. If the duration time of the light signal is less than 2 s, then the light signal is taken as an invalid signal, and thus the interactive recognizing system comes back to the standby state; if the duration time of the light signal is more than 2 s, then the light signal is initially taken as a valid signal, and thus the subsequent process continues. The duration time of the light signal herein may be a duration time that the irradiation point of the light signal on the sensing unit keeps unchanged, or may be a duration time that the irradiation point of the light signal on the sensing unit moves continually.

Figure 3:
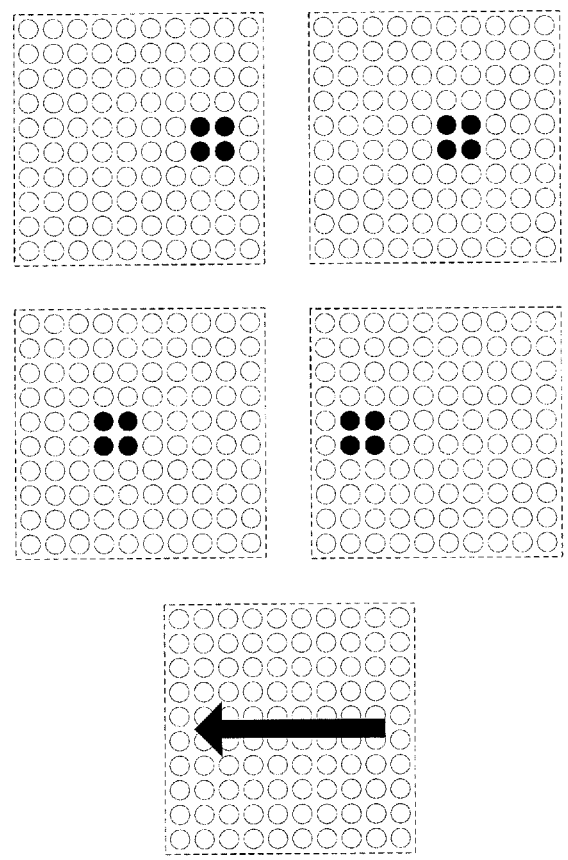
FIGS. 3 and 4 are schematic diagrams of a motion track of recognizing a light signal by an interactive recognizing system provided in an embodiment of the present disclosure.
Figure 4:
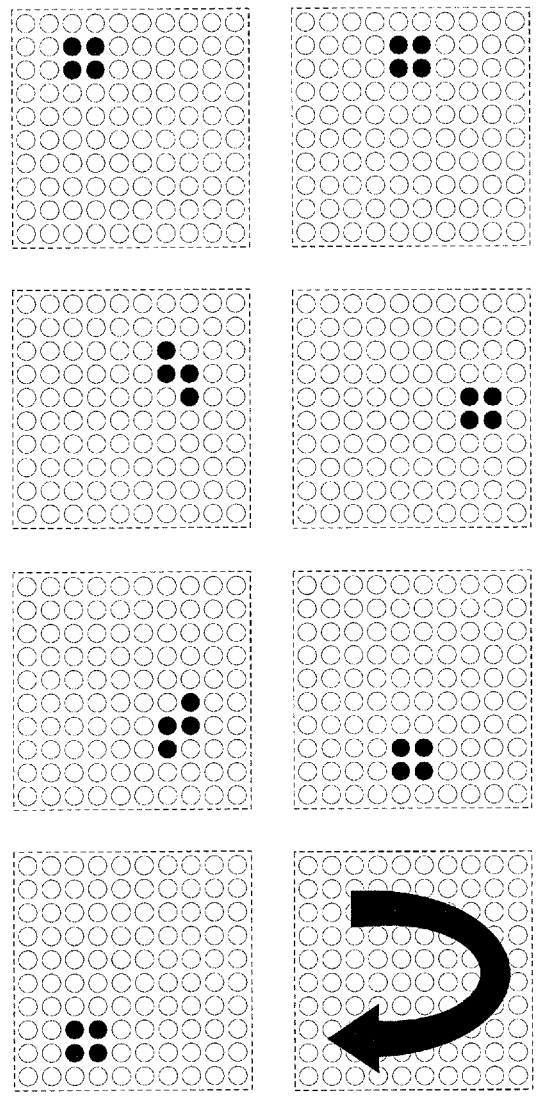

In the case that it is initially determined the detected light signal is a valid signal, the coordinate recognizing unit 2 can then recognize the motion track of the detected light signal. For example, when the user draws a graph on the sensing unit 1 by using the laser pointer, the track of the graph drawn by the user can be recognized through a mutual cooperation of the horizontal ordinate recognizing subunit 21 and the vertical ordinate recognizing subunit 22 in the coordinate recognizing unit 2. For example, for a motion track of a straight line drawn from left to right by the user, as shown in FIG. 3, the coordinate recognizing unit 2 can recognize the straight line motion track from left to right; for another example, for a motion track of a curve drawn clockwise by the user, as shown in FIG. 4, the coordinate recognizing unit 2 can recognize the clockwise curve motion track.

Then, the determining unit 3 determines the motion track recognized by the coordinate recognizing unit 2, so as to determine the control instruction represented by the motion track. As a preferred solution, a storing subunit 32 can be arranged in the determining unit 3, and a correspondence relationship between respective motion tracks and control instructions is stored in the storing subunit 32. For example, it can be stored in the storing subunit 32 that the motion track in FIG. 3 is corresponding to an instruction of "next page" and that the motion track in FIG. 4 is corresponding to an instruction of "back". The determining unit 3 looks up the motion track of the light signal recognized by the coordinate recognizing unit 2 in the storing subunit 32. If the determining unit 3 has looked up a control instruction corresponding to the motion track, it is determined that the motion track of the light signal is the control instruction; if the determining unit 3 has not looked up a control instruction corresponding to the motion track, it is determined that the motion track of the light signal is an invalid control instruction. In particular, the determining unit 3 can compare the motion track of the light signal recognized by the coordinate recognizing unit 2 with the motion track stored in the storing subunit 32, so as to determine the motion track corresponding to the motion track of the light signal and stored in the storing subunit 32 and determine the control instruction corresponding to the determined motion track as the control instruction corresponding to the motion track of the light track.

If the motion track of the light signal is determined as a valid control instruction, a corresponding control instruction is sent to the executing unit 4 and executed by the executing unit 4, and then the interactive recognizing system comes back to the standby state. If the motion track of the light signal is determined as an invalid control instruction, the interactive recognizing system directly comes back to the standby state.

Further, after the determining unit 3 determines the motion track, a determination result is sent to the feedback unit 5. No matter whether the determination result is a valid control instruction or an invalid control instruction, the feedback unit 5 will perform a corresponding feedback, so as to inform the operation result to the user.

In the interactive recognizing system provided in the embodiment of the present disclosure, by using the photodiodes 10 to form the sensing unit 1 so as to receive the light signal, the user can utilize the laser pointer to transmit the light signal to the sensing unit 1 and move the laser pointer, so that the irradiation point of the laser pointer on the sensing unit 1 has certain motion track. The coordinate recognizing unit 2 can recognize the motion track, then the determining unit 3 determines the control instruction represented by the motion track, and finally the executing unit 4 executes the control instruction. Therefore, the interactive recognizing system provided in the present disclosure does not require to be provided with an external device with a high cost, because using the laser pointer is capable of implementing operation of human-computer interaction, so as to reduce cost of the device used to perform human-computer interaction.

In addition, due to different action habits and accents of different users, the recognition rate of the existing human-computer interaction manners such as the gesture recognizing control, the voice recognizing control and the somatosensory recognizing control is relatively low. In contrast, the interaction recognizing system provided in the embodiment of the present disclosure performs recognition according to the motion track of the irritation point of the light signal, uses a kind of symbolic recognizing manner, and is basically not influenced by personal operation habits, and thus recognition rate of the control instruction is high.

It shall be noted that the sensing unit in the embodiment of the present disclosure is constituted of photosensitive diodes and generates a driving current when the light signal is received, and other types of sensing devices may also be adopted in other embodiments. For example, by adopting a sensing diode that senses visible light, when the interactive recognizing system is in the standby state, the whole sensing unit is irradiated by ambient lights, and the user can directly use finger to move on the sensing unit upon performing interaction operation, the part shaded by the fingers will not be irradiated by the ambient lights, and thus the coordinate recognizing unit can recognize the coordinate of the area not irradiated. As the user's finger moves, the coordinate recognizing unit recognizes the motion track of the area not irradiated, then the determining unit determines the corresponding control instruction according to the motion track, and finally the executing unit executes the control instruction.

In an embodiment of the present disclosure, there is further provided a display device. The display device can be any product or means having a display function that can be used for human-computer interaction, such as a liquid crystal panel, an electronic paper, an OLED panel, a liquid crystal TV set, a liquid crystal display and so on.

The display device comprises a display module and the interaction recognizing system provided in the above embodiment of the present disclosure. Preferably, the sensing unit of the interactive recognizing system is arranged on the display module, for example, the sensing unit is arranged on an outer surface of the display module in a form similar to an out-cell touch device. Such arrangement is helpful for the sensing unit to conveniently receive external light signal.

Since the display device provided in the embodiment of the present disclosure and the interaction recognizing system provided in the embodiment of the present disclosure have the same technical feature, they can produce the same technical effect, and solve the same technical problem. The user can directly utilize a point light source such as a laser pointer to send a control instruction while viewing the image displayed by the display device, so as to facilitate implementation of human-computer interaction.

The above descriptions are specific implementations of the present disclosure, but the protection scope of the present disclosure is not limited thereto. Alternations or replacements that can be easily conceived by those skilled in the art within the technical scope disclosed in the present invention shall be covered within the protection scope of the present disclosure. Therefore, the protection scope of the present invention shall be defined by the protection scope of the claims.

What is claimed is:

1. An interactive recognition system, comprising:
   a sensing unit configured to receive light signal;
   a coordinate recognizing unit configured to recognize a coordinate of the light signal received by the sensing unit on the sensing unit and recognize a motion track of the light signal on the sensing unit;
   a determining unit configured to determine a control instruction represented by the motion track; and
   an executing unit configured to execute the control instruction;
   wherein the determining unit comprises a threshold determining subunit, in which a time threshold that the light signal lasts is stored, and
   the threshold determining subunit initially determines the light signal as a valid signal when a duration time of the light signal exceeds the time threshold.

2. The interactive recognizing system according to claim 1, wherein the sensing unit is a sensing matrix formed by an arrangement of several sensing devices.

3. The interactive recognizing system according to claim 2, wherein the sensing device is a photosensitive diode.

4. The interactive recognizing system according to claim 1, wherein the coordinate recognizing unit comprises a horizontal ordinate recognizing subunit and a vertical ordinate recognizing subunit configured to recognize a horizontal ordinate and a vertical ordinate of the light signal received by the sensing unit on the sensing unit, respectively.

5. The interactive recognizing system according to claim 1, wherein the determining unit comprises a storing subunit configured to store a correspondence relationship between a motion track and a control instruction,
    wherein the determining unit compares a motion track of the light signal recognized by the coordinate recognizing unit with a motion track stored in the storing subunit, so as to determine a control instruction corresponding to the motion track of the light signal.

6. The interactive recognizing system according to claim 1, wherein the determining unit comprises a storing subunit configured to store a correspondence relationship between a motion track and a control instruction,
    wherein for the light signal that is initially determined by the threshold determining subunit as a valid signal, the coordinate recognizing unit recognizes the motion track of the light signal, and the determining unit compares the motion track of the light signal with the motion track stored in the storing subunit, so as to determine a control instruction corresponding to the motion track of the light signal.

7. The interactive recognizing system according to claim 1, wherein the interactive recognizing system further comprises a feedback unit configured to prompt the control instruction determined by the determining unit.

8. The interactive recognizing system according to claim 7, wherein the feedback unit comprises at least one of an indicator, a screen and a loudspeaker.

9. A display device comprising a display module and an interactive recognizing system, wherein the interactive recognizing system comprises
    a sensing unit configured to receive light signal;
    a coordinate recognizing unit configured to recognize a coordinate of the light signal received by the sensing unit on the sensing unit and recognize a motion track of the light signal on the sensing unit;
    a determining unit configured to determine a control instruction represented by the motion track; and
    an executing unit configured to execute the control instruction;
    wherein the determining unit comprises a threshold determining subunit, in which a time threshold that the light signal lasts is stored, and
    the threshold determining subunit initially determines the light signal as a valid signal when a duration time of the light signal exceeds the time threshold.

10. The display device according to claim 9, wherein the sensing unit is a sensing matrix formed by an arrangement of several sensing devices.

11. The display device according to claim 10, wherein the sensing device is a photosensitive diode.

12. The display device according to claim 9, wherein the coordinate recognizing unit comprises a horizontal ordinate recognizing subunit and a vertical ordinate recognizing subunit configured to recognize a horizontal ordinate and a vertical ordinate of the light signal received by the sensing unit on the sensing unit, respectively.

13. The display device according to claim 9, wherein the determining unit comprises a storing subunit configured to store a correspondence relationship between a motion track and a control instruction,
    wherein the determining unit compares a motion track of the light signal recognized by the coordinate recognizing unit with a motion track stored in the storing subunit, so as to determine a control instruction corresponding to the motion track of the light signal.

14. The display device according to claim 9, wherein the determining unit comprises a storing subunit configured to store a correspondence relationship between a motion track and a control instruction,
    wherein for the light signal that is initially determined by the threshold determining subunit as a valid signal, the coordinate recognizing unit recognizes the motion track of the light signal, and the determining unit compares the motion track of the light signal with the motion track stored in the storing subunit, so as to determine a control instruction corresponding to the motion track of the light signal.

15. The display device according to claim 9, wherein the interactive recognizing system further comprises a feedback unit configured to prompt the control instruction determined by the determining unit.

16. The display device according to claim 15, wherein the feedback unit comprises at least one of an indicator, a screen and a loudspeaker.

17. The display device according to claim 9, wherein the sensing unit of the interactive recognizing system is arranged on the display module.

* * * * *